United States Patent [19]

Hartkopf et al.

[11] Patent Number: 4,680,809
[45] Date of Patent: Jul. 14, 1987

[54] LIGHT WAVEGUIDE COUPLING DEVICE

[75] Inventors: Hans-Otto Hartkopf; Christoph Zeller, both of Brunswick, Fed. Rep. of Germany

[73] Assignee: Siemens Aktiengesellschaft, Berlin and Munich, Fed. Rep. of Germany

[21] Appl. No.: 607,014

[22] Filed: May 4, 1984

[30] Foreign Application Priority Data

May 13, 1983 [DE] Fed. Rep. of Germany ....... 3317541

[51] Int. Cl.[4] .......................... G02F 1/00; G02B 6/28; H04B 3/38
[52] U.S. Cl. .................. 455/601; 350/96.10; 350/96.15; 350/96.16; 455/600; 455/606; 370/1
[58] Field of Search ............... 350/96.10, 96.15, 96.16, 350/96.20, 96.21, 96.22, 96.23; 250/227; 455/610, 612, 613, 600, 601, 606; 179/170 R, 170 F, 170 HF; 174/70 R, 70 S

[56] References Cited

U.S. PATENT DOCUMENTS

| 4,112,293 | 9/1978 | Käch .................. 350/96.16 |
| 4,211,920 | 7/1980 | Wakabayashi ............ 455/601 |
| 4,406,513 | 9/1983 | Raphael .................. 350/96.16 |
| 4,549,782 | 10/1985 | Miller .................. 350/96.15 |
| 4,551,829 | 11/1985 | Dragoo et al. .......... 350/96.16 |

FOREIGN PATENT DOCUMENTS

| 3241942 | 5/1984 | Fed. Rep. of Germany ... 350/96.16 |
| 1577603 | 10/1980 | United Kingdom ............... 455/601 |

OTHER PUBLICATIONS

Albanese, "Fail-Safe Nodes for Lightguide Digital Networks" Bell Syst. Tech. Jour., vol. 61, No. 2, 2/82, pp. 247-256.
Wuttke et al, "Erstos Vollelektronisches Stellwerk für Nahverkehrsbahnen Der Nahverkehr, 4/83, pp. 34-42.

Primary Examiner—William L. Sikes
Assistant Examiner—Brian M. Healy
Attorney, Agent, or Firm—Hill, Van Santen, Steadman & Simpson

[57] ABSTRACT

A light waveguide coupling device which is inserted at regular intervals along the light wave transmission link with each coupling device for each direction of transmission having a channel having a transducer module for converting optical signals into electrical signals, a regenerating amplifier to amplify the electrical signals and a transducer module for converting electrical signals back into optical signals for further transmission characterized by at least one external electrical connection terminal for each channel so that a remote control element can be connected into the waveguide system at the coupling device.

6 Claims, 1 Drawing Figure

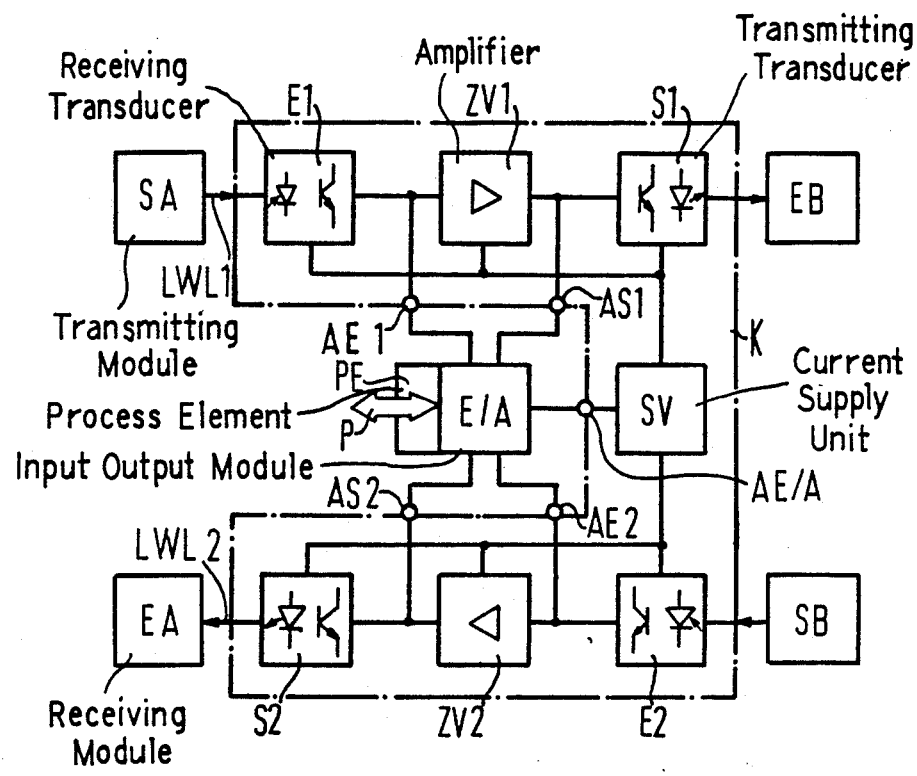

LIGHT WAVEGUIDE COUPLING DEVICE

BACKGROUND OF THE INVENTION

The present invention is directed to a light waveguide and a coupling device which for each direction of transmission of signals has a receiving transducer module coupled by a regenerating amplifier to a transmitting transducer module.

When transferring signals via lines which extend between transmitting and receiving stations arranged at a considerable distance from one another, it is known to connect amplifier modules into the transmission path to compensate for attenuation that has occurred on the transmission path section up to the point of the relevant amplifier module. These regenerative amplifier modules are required both in the case of signals transmitted via copper conductors and also in cases of optical signal transmissions which are on light waveguides. However, with light waveguides and the optical signals transmitted thereon, special transducer modules are required in addition to the actual amplifier to convert the light signal into an electrical signal and then to reconvert the regenerated electrical signal back into light signals. One known device which fulfills these requirements is described in U.S. Pat. No. 4,112,293 and the disclosure of that patent is incorporated herein by reference thereto. In this patent, the device includes an optical coupling module which serves to output-couple and input-couple a portion of the light signals out of and into the light waveguide as the case may be. The device also includes a receiver module which converts the optical signal into an electrical signal, an amplifier module for amplifying and regenerating the electrical signal and finally a transmitting module which serves to photoelectrically convert the regenerated electrical signal back into a light signal.

If an existing remote control system, which comprises a given number of stations such as six stations, is to be expanded by having the number of stations increased, the amount of work that will be necessary will depend upon the required location of the new station. For example, if the new station is to be added at the end of existing light waveguide, then the transmission or the light waveguide will be extended. However, if the new station is interposed between two existing stations, then the transmission or the light waveguide will need to be cut and the new station will be interposed between the cut ends of the light waveguide. If the new station is to be permanently linked into the remote control system, the outlay for the subsequent installation of the coupling assembly off-site and the operating obstacles represented by the division and subsequent assembly of the light waveguide may be tolerated. However, if the station or device is only to be temporarily linked into the existing remote control system operated via the waveguides, the outlay in respect to the necessary installation measures which in such case must take place off-site and the disadvantages produced by the operating obstacles cannot be readily justified. For this reason, in order to temporarily link a station or device to a remote control system, a special transmission channel, for example, a radio link, is frequently installed via which the station or device can be operated.

SUMMARY OF THE INVENTION

The present invention is directed to an object of minimizing the outlay for the subsequent installation of an off-site a station or device which is to be included into a remote control system and to keep the disconnect time required as a result of the subsequent linking of the station into the remote control system and likewise the period during which normal operation is prevented within the narrowest limits. The invention consists of a light waveguide coupling device which has a channel for each direction of transmission of the optical signals and each channel is provided with a receiving transducer means or module for converting the optical signals into electrical signals and a transmitting transducer means or module for converting electrical signals back into optical signals. The coupling device includes the improvement of having at least one connection terminal being provided for each channel or each direction of transmission with this terminal being connected to either the output of the receiving module or the input of the transducer module. Preferably, in addition to the receiving transducer module which is a photoelectrically derived signal, each channel has an amplifier means for amplifying the electrical signal converted from the optical signal prior to it being retransmitted by the transmitting transducer module and preferably for each channel or direction of transmission there are two connection terminals and there is also a terminal to a current supply which is preferably part of the coupling device.

Thus, the interruption of normal working of a remote control link caused during subsequent linking of a station into a remote control system can be minimized by installing the coupling device with the connecting elements at specific intervals in the remote control link itself which can then serve to subsequently link a station or device into the remote control system. As the coupling devices are already arranged at regular intervals to receive, regenerate and forward the transmitted signals, they represent a suitable site for such connections.

BRIEF DESCRIPTION OF THE DRAWINGS

The FIGURE schematically illustrates one exemplary embodiment of the present invention.

DESCRIPTION OF THE PREFERRED EMBODIMENTS

The principles of the present invention are particularly useful in a coupling device K illustrated schematically in the drawing. The coupling device K serves to receive signals via two light waveguide channels LWL1 and LWL2 from respective remote transmitting modules SA and SB. The coupling device also regenerates the received signals and forwards them to the respective remote receiving modules EB and EA. For each direction of transmission, two of which are illustrated, the coupling device K possesses a channel. Each channel has a receiving transducer means or module E1 or E2, which converts the optical signal into an electrical signal. The output of the modules E1 and E2, respectively, is coupled to an intermediate regenerator or amplifiers ZV1 and ZV2, respectively. The output of the amplifiers ZV1 and ZV2 are connected to transmitting transducer modules S1 and S2, respectively, which modules or means for converting the regenerated electrical signal into an optical signal for transmission on the waveguide such as LWL1 and LWL2, respectively. These modules are supplied by a current supply unit SV which is arranged centrally in the device K.

To facilitate subsequent linking of a station or other devices to the remote control system, the coupling device K is provided with connecting terminals AE1, AS1, AS2, AE2 and AE/A and all of these terminals are accessible from the outside of the coupling device K. Two of the connecting terminals are assigned to each transmission channel or line. Thus, for example, the connecting terminal AE1 is connected to the output of the receiving transducer module E1 and the connecting terminal AS1 is connected to the input of the transmitting transducer module S1. In a similar manner, the connection terminal AE2 is connected to the output of the receiving transducer E2 and the connection terminal AS2 is connected to the input of the transmitting transducer module S2. The connection terminal AE/A serves to tap a supply voltage from the current supply unit SV.

For the subsequent installation of a station or other device utilizing the coupling device K, an input/output module E/A or a processing unit PE is provided and each of these modules or elements has a two-way access to the light waveguide LWL1 via the connections AE1 and AS1 and has a two-way access to the light waveguide LWL2 by the connection terminals AE2 and AS2. The access couplings take place via OR gates (not shown). The input/output module E/A serve in a known manner to convert the photoelectrically derived signals received via the light waveguides into a form which is suitable for an arbitrary process control unit P, for example, into voltage signals of a specific level. A further function of the input/output assembly E/A is to convert data received in series modes into a parallel mode representation. The process unit PE, when subsequently linked into the remote control system via the input/output module EA is at all times familiar with the signals transmitted during operation of the two light waveguide channels and their time relationship with one another so that with appropriate addressing, it is not only capable of receiving all information, but can also promptly phase itself into the information flow and feed output data via the light waveguides onto other processing elements.

The invention can be used with advantage wherever a specific process element is to be subsequently linked into a remote control system and in particular where the link is to be a temporary link. This can be of interest to provide the temporary connection of test and diagnostic devices in order to check the function of specific elements within the remote control system, for example. A preferred use of the invention consists in railway safety installations for the control of roadway elements via so-called control computers. An example of such a control system is described in German magazine "*Der Nahverkehr*", 4/83, pp. 34–42 and in particular on page 39. All control computers, which are continuously required, are permanently connected to one another via the light waveguide bus. If it necessary to use additional switch points and signals to transfer positions to the opposite track, for example, during structural repair on a line, the application of the invention merely requires that the control computer be held in readiness for this auxiliary operating location and be connected to a coupling device which is as close as possible to the transfer location. This can be effected, for example, via a premanufactured standard cable. The control computer assigned to the auxiliary operating location can be approached by address by the other computers within the system and data can be passed via the light waveguide or waveguides to the other control computers or to a superordinate section computer.

In the representative exemplary embodiment, a central current supply unit or power supply unit SV is provided for the transmitting and receiving transducer modules which are assigned to the directions of transmission and for the associated intermediate amplifiers. However, it is also possible to allocate a separate current supply to each channel and each direction of transmission. In the event of a breakdown in the current supply device of this kind, data traffic would still be possible via the unaffected light conductor. Similarly, separate input and output modules could also be provided for the two directions of transmission. When using a bus system which is to be operated bidirectionally, the light waveguides indicated on the right and left-hand side of the coupling assembly may be interconnected via a decoupling unit to form a common bus.

The particular advantage of the coupling device constructed in accordance with the invention is that the provision of the connection terminals for the subsequent installation of process elements requires virtually no technical and material outlay, but provide that in the event of need for a later installation of such a process element, no unsuitably high cost of operating obstructions result from the installation measures. The light waveguide or waveguides are not required to be subsequently cut or divided and then reassembled for the connection of such a process element because the coupling of this element takes place in the intermediate area that is separated from the light signal section by the photoelectric signal transducers.

Instead of providing separate connection terminals for the output coupling and the input coupling of the signals out of and into the transmission link, as the case may be, it can be sufficient to provide a common connection terminal for each direction of transmission which is preferably connected to the input of the transmitting module assigned to the transmission direction in question. The output coupling of signals to the subsequently installed process element then takes place following the amplification and regeneration of the signals by the intermediate amplifier. Alternatively, the signals emitted by this process element can be inserted into the transmission path or paths prior to the intermediate amplifier. A system configuration of this kind is particularly suitable for the operation of process elements which are to be installed at specific distances from the coupling device.

Any insulated connecting terminal which is suitable for carrying a potential can be used. Examples are screws, plugs, solder connections and clamping devices.

Although various minor modifications may be suggested by those versed in the art, it should be understood that we wish to embody within the scope of the patent granted hereon, all such modifications as reasonably and properly come within the scope of our contribution to the art.

We claim:

1. A light waveguide device for use in a light waveguide transmission system to regenerate an optical signal even at locations where no data branching is provided, said device comprising two channels with one channel for each direction of transmission of optical signals, each channel having receiving transducer means for converting the optical signals into electrical signals, amplifying means to regenerate the electrical signals into amplified electrical signals, and transmitting transducer means for converting the amplified electrical signals into optical signals for further transmission on an optical waveguide of the system, each channel having at least one connection terminal being connected between an output of the receiving transducer means and an input of the transmitting transducer means, each connection terminal being directly accessible from the outside of the divice so that the device can be subsequently used to link another unit into the system with signals in each channel being coupled out to the unit and another signal from the unit being coupled into each channel.

2. A light waveguide device according to claim 1, which further includes a voltage supply source coupled to each of the transducer means and amplifying means, said voltage supply source having an external connecting terminal to provide a voltage source to the remote location.

3. A light waveguide device according to claim 1, wherein each channel has two connecting terminals with one connecting terminal being connected to the output of the receiving transducer means of the channel and the other terminal being connected to the input of the associated transmitting transducer means.

4. A light waveguide device according to claim 3, which further includes a voltage supply source coupled to each of the transducer means, and amplifying means, said voltage supply source having an external connecting terminal to provide a voltage source to a remote location.

5. A light waveguide device according to claim 3, wherein each of the connecting terminals connected to the output of the receiving transducer means are available for providing output signals to a process element which is subsequently connected to said device and the connecting terminal connected to the input of the transmitting transducer means are available for receiving input signals from the subsequently connected process element.

6. A light waveguide device according to claim 5, which further includes a voltage supply source coupled to each of the transducer means and amplifying means, said voltage supply source having an external connecting terminal to provide a voltage source to the device.

* * * * *